Aug. 25, 1959 E. F. ECHOLDS ET AL 2,900,825
EDDY-CURRENT FORCE SYSTEMS FOR CONSTRAINED GYROSCOPES
Filed April 9, 1954 2 Sheets-Sheet 1
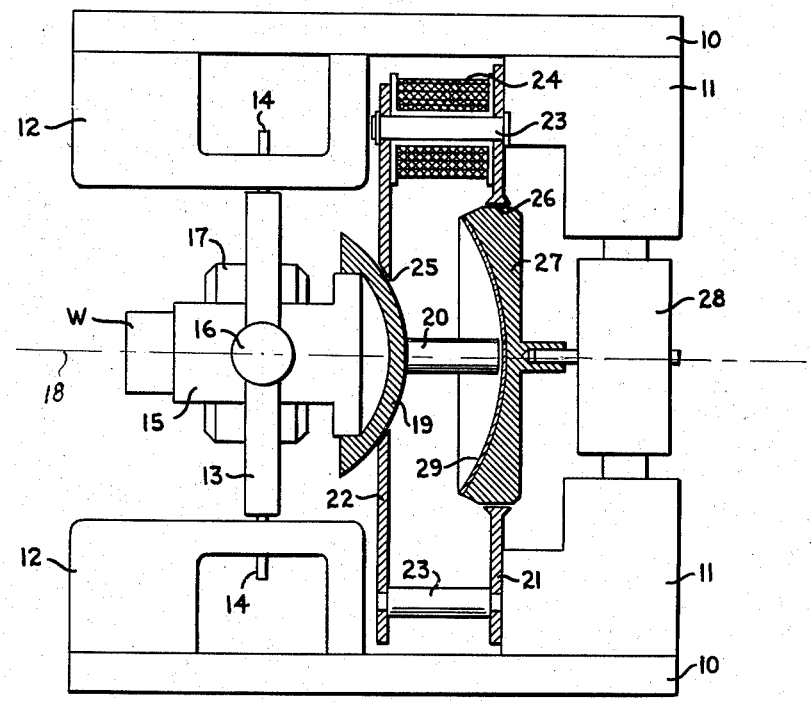
FIG. 1
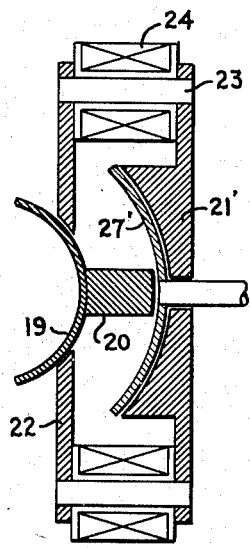
FIG. 2
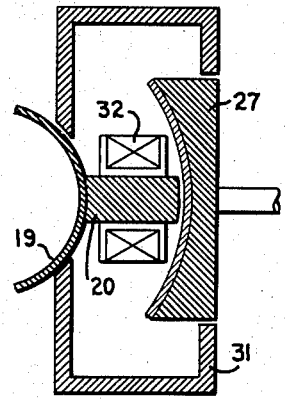
FIG. 3
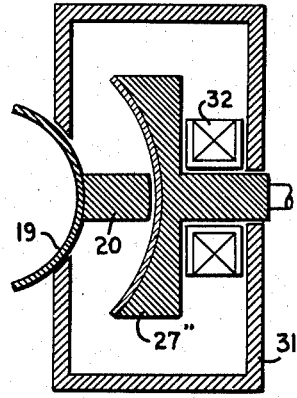
FIG. 4
INVENTORS
E. FRANK ECHOLDS
PAUL L. BRINK
BY
ATTYS.

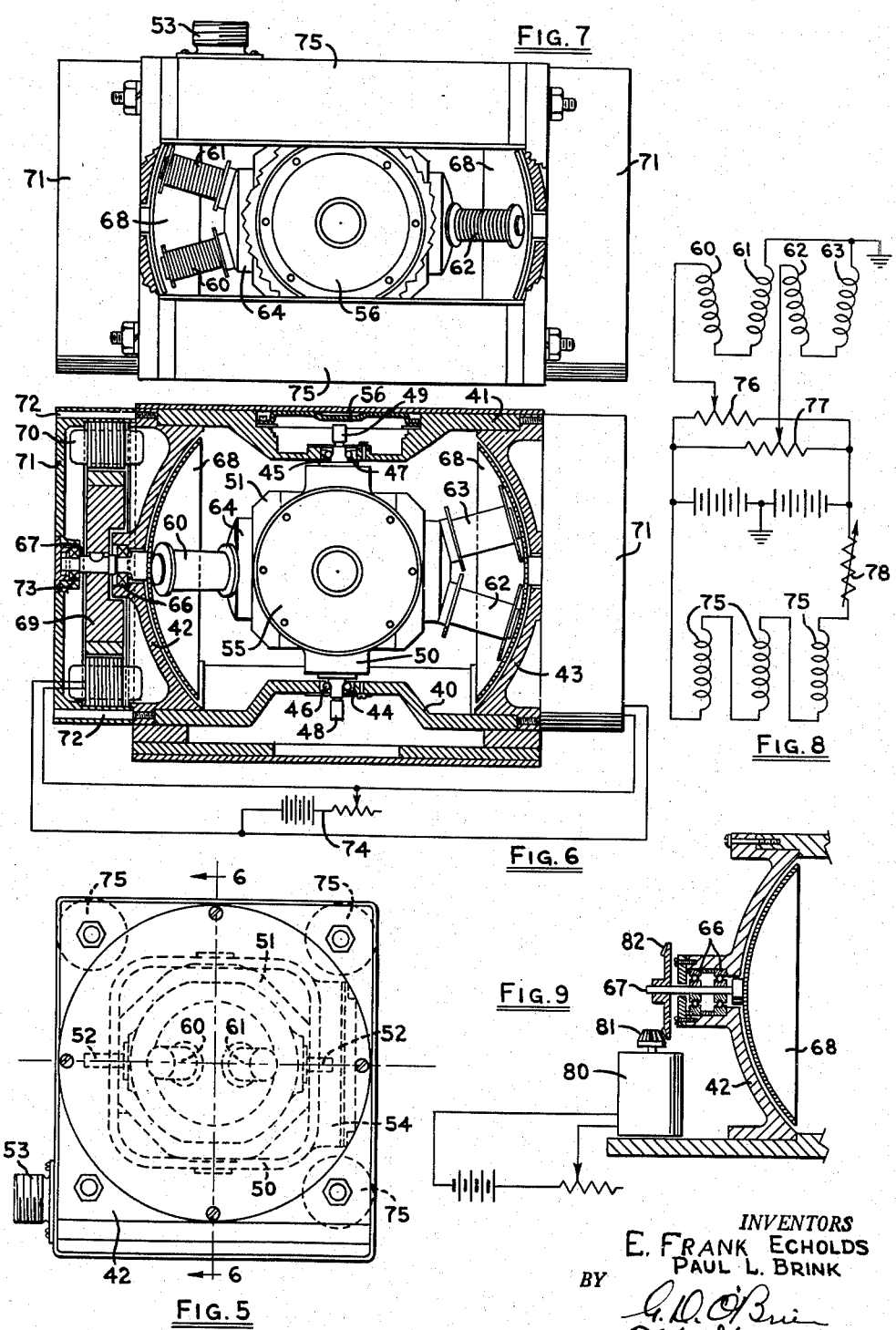

United States Patent Office 2,900,825
Patented Aug. 25, 1959

2,900,825

EDDY-CURRENT FORCE SYSTEMS FOR CONSTRAINED GYROSCOPES

E. Frank Echolds and Paul L. Brink, Indianapolis, Ind.

Application April 9, 1954, Serial No. 422,282

14 Claims. (Cl. 74—5.46)

(Granted under Title 35, U.S. Code (1952), sec. 266)

The invention described herein may be manufactured and used by or for the Government of the United States of America for governmental purposes without the payment of any royalties thereon or therefor.

This invention relates to gyroscopic devices and more particularly to the improvement of an eddy-current type of force system for computing constrained gyroscopes in which the system is capable of having predetermined deflection factors introduced therein to provide for computed gyroscope orientation.

The usual and well known eddy-current type of force system used in constrained gyroscopes has a conducting disk fixed to the gyroscope rotor shaft to rotate therewith and to pivot with the rotor about the gyroscope gimbal axes. This disk is spherical in contour, being convex on the side removed from the rotor, and moves over a magnet pole fixed to the gyroscope frame. The magnet pole is ordinarily an electromagnet in order that it may be energized, de-energized, or varied in intensity to control the field. Upon energization of the magnet pole a magnetic field is established through the pole, the disk, and the return magnetic circuit to the magnet pole. The field through the disk is effectively cut by the spinning thereof which produces eddy-currents in the disk. The eddy-currents are electrical currents which flow in small closed paths and the reaction of the field of these currents with the primary magnetic field creates forces which oppose the motion of the disk. These forces become greater as the center of the disk moves from the magnet pole, or the field center, since the rate of cutting the field becomes increasingly greater which creates a torque on the gyroscope to return it to the position wherein the disk is realigned with the magnet pole or center of field. The magnitude of the eddy-current forces may be controlled by the strength of the magnetic field.

While the above eddy-current force system has been extensively used, it has a number of disadvantages. Considerable mechanical power is required of the motor which drives the gyroscope rotor or wheel to overcome the drag torque of the eddy-current forces since the eddy-current forces tend to oppose the spin of the disk. To provide an efficient gyroscope the rotor thereof should spin at speeds from 12,000 revolutions per minute (r.p.m.) to about 24,000 r.p.m. but the power necessary to drive it at these speeds with the disk attached becomes prohibitive. If the rotor is spun fast to get good gyroscopic properties, excessive distortion of the primary field results due to the large secondary field of the eddy-currents. Further, the large torque required to spin the rotor to overcome the drag torque on the disk produces gimbal errors or errors in the gimbal position resulting from the reaction of the rotor motor on the gimbal to the case.

In the present invention the disk is independent of the gyroscope rotor and is independently powered to spin on a fixed axis whereby the gyroscope is precessed by the reactive forces of the eddy-currents. The disk surface adjacent the gyroscope is concave with the center of curvature lying at the intersection of the gyroscope gimbal axes, and a magnet pole means fixed to the gyroscope is adaptable to sweep over this concave surface of the disk. A magnet field is established through the pole means and the disk as in the old devices but the torque drag on the disk is ineffective on the gyroscope rotor. For all the eddy-current forces exerted on the disk there are equal and opposite reactive forces exerted on the pole means fixed to the gyroscope which forces precess the gyroscope to its proper position. The primary field is preferably established by electromagnets that are positioned at any suitable positions but are more advantageously placed in the return field circuit as on the gyroscope support or frame. It is a further contemplation of this invention to utilize a plurality of electromagnets to establish the field and to utilize one or more electromagnet coils at the pole means, as control coils, to control the current therein in order to introduce predetermined deflection factors in the eddy-current reactive forces. It is further contemplated and preferred in this invention to utilize an eddy-current force system at each end of the gyroscope.

The eddy-current force system constructed in the manner as disclosed herein has many advantages over the old and well known system. The power to drive the gyroscope rotor at desired speeds of 12,000 to 24,000 r.p.m. can be held at a minimum since only the rotor is driven. By maintaining high rotative speeds of the gyroscope rotor good gyroscopic properties are obtained and magnetic distortions are minimized. Gimbaling errors due to the torque resulting from driving the gyroscope rotor are negligible and much less power is needed to drive the rotor only. As a result of being able to reduce the size of the gyroscope motor and of eliminating the disk from the gyroscope rotor, a more favorable angular momentum to weight ratio may be maintained. Also, the elimination of the disk from the gyroscope rotor reduces the aerodynamic drag because the rotor can be hermetically sealed in a case which further results in increased life for the gyroscope rotor bearings. The present construction also makes it possible to use a highly effective method of nutation damping although a nutation damping system forms no part of the present invention. It is therefore a general object of this invention to provide an eddy-current force applying system for precessing constrained gyroscopes in which force applying system predetermined deflection factors may be introduced to provide gyroscope computed results useful in directing or controlling remote mechanisms.

These and other objects, advantages, features, and uses will become more apparent as the description proceeds when considered with the accompanying drawings, in which:

Figure 1 illustrates one form of the invention shown partly in section and partly in elevation;

Figure 2 illustrates a partial sectional view of a modification of the magnetic field circuit;

Figure 3 illustrates a partial sectional view of another modification of the magnetic field circuit;

Figure 4 illustrates a partial sectional view of still another modification of the magnetic field circuit;

Figure 5 is an end elevational view of a double ended gyroscope of this invention with internal parts shown in broken lines;

Figure 6 is a longitudinal cross-sectional view taken on the line 6—6 of Figure 5 looking in the direction of the arrows;

Figure 7 is a top view of the double ended gyroscope shown in Figure 5 with parts broken away to show constructional details;

Figure 8 is a schematic wiring diagram of the range and trail coils; and

Figure 9 is a partial sectional view of a modified form for powering the eddy-current disk.

Referring more particularly to Fig. 1, there is shown a gyroscopic device illustrating the invention in which frame members 10 have motor supports 11 and gyroscope gimbal supports 12 thereon. The principal gimbal ring 13 of the gyroscope is rotatively mounted on diametrical trunnions 14 in the gimbal supports 12 by roller type bearings (not shown) as well understood in the gyroscopic art. The inner gimbal ring 15 is rotatively mounted on trunnions in the principal gimbal ring 13 on an axis 16 perpendicular to the axis through trunnions 14. A gyroscope rotor or wheel 17 is journaled within the inner gimbal ring 15 on an axis 18 perpendicular to the axis of the inner gimbal ring 15. On one end of the inner gimbal ring 15 is fixed a spherical segment 19 having the center of curvature at the intersection of the gyroscope rotor and gimbal axes. The spherical segment 19 has a pole extension 20 thereon that extends outwardly in alignment with the rotor axis. The spherical segment 19 and pole 20 are of high permeable magnetic material.

Detachably fixed to the inner ends of the motor supports 11 is a core member consisting of end ring plates 21 and 22 spaced by posts 23 some of which posts support electrical coils 24 thereon. The end ring plate 22 has a central opening 25 accommodating the spherical segment 19 with the periphery of the opening having a spherical contour in close air spaced relation with the spherical segment. The end ring plate 21 has a central cylindrical opening 26 in alignment with the opening 25. Rotatable in the opening 26 is a disk 27 powered by a motor 28 supported on the motor supports 11. The inner face of the disk 27 is spherically concave at 29 with an electrically conducting plating thereon as of copper or copper alloy. The spherically concave surface 29 has its center of curvature coincident with that of the spherical segment 19 whereby the end of the pole 20 is adapted to pass over the surface 29 of the disk with a small air-gap therebetween. The motor 28 with the disk 27 thereon is adjustable axially to vary the air-gap between the pole 20 and the surface 29. The disk 27 is of high permeable magnetic material and the periphery of this disk is in close air-spaced relation with the periphery of the ring plate hole 26. A complete magnetic field circuit is therefore established from the electrical coils 24 through the ring plate 21, across the air-gap through the disk 27, across the air-gap through the pole 20 and the spherical segment 19, and across the air-gap through the ring plate 22 to the coils 24.

Various modifications of the structure may be made without materially altering the desirable magnetic field as illustrated in Figs. 2, 3, and 4. Letting like reference characters refer to like parts, as shown in Fig. 2, the ring plate 21 of Fig. 1 may be modified to the form shown by 21′ and disk 27′ made of a thin sheet of metal of high electrical permeability, as copper or copper alloy. The number of air-spaces in Fig. 2 are the same as for Fig. 1. In Fig. 3, the core member is modified as shown by 31 to be integral without any electrical coils thereon and an electrical coil 32 is fixed to the pole 20 to establish the field. In Fig. 4, the electrical coil 32 is placed on the driving shank of the disk 27″ to establish the magnetic field circuit.

The operation of Figs. 1 to 4 will be explained by reference to Fig. 1, the understanding of which will readily clarify the significance of Figs. 2, 3, and 4. Let it be assumed that the gyroscope rotor 17 is given a spinning motion by motive means in a manner well known in the art and the coils 24 are energized. The disk 27 is set into spinning motion by the motor 28. The spin of the disk 27 cuts the field producing eddy-currents in the disk surface 29. These eddy-currents produce a force opposing the rotation of the disk which is only effective on the driving power of the motor 28. These forces are a minimum so long as the pole 20 remains in alignment with the spin axis of the disk 27. Whenever the gyroscope deviates in any direction from its neutral position in which the pole 20 is misaligned with the spin axis of the disk 27, the rate of cutting the field is increased since the pole is at a greater radius of the disk 27 producing greater eddy-currents, the reaction of which tend to precess the gyroscope back to its neutral position. Since the velocity of the disk 27 past the pole 20 depends on how far the gyroscope has deviated from its neutral position, the force system is analogous to a mechanical spring and the spring force is proportional to deviation or deflection. The magnitude of the reactive forces on the gyroscope may be varied by varying the current through the coils 24, by varying the rotative speed of the disk 27, or by varying the air-spaces in the field circuit.

By the present construction and operation a very efficient gyroscope can be provided since the rotor thereof can be powered to be rotated in the speed range of 12,000 to 24,000 r.p.m. with only the primary inertia of the rotor and its bearing friction to overcome. The gyroscope rotor can be hermetically sealed in an evacuated case whereby there would be substantially no aerodynamic drag. The disk 27, on the other hand, can be rotated at a much lower speed than the gyroscope rotor, as for example 2000 to 4000 r.p.m., and the speed of this disk and the air-gap space can be relatively controlled to minimize the magnetic distortions caused by a secondary field established by the eddy-currents that distort the primary field. The motor for driving the disk, as 28, may be of any desirable power necessary to overcome the friction, aerodynamic drag, and torque drag since its weight or reaction will not affect the gyroscope functions from which precession measurements are to be computed. In the present invention the gimbaling error resulting from the reaction of the gyroscope rotor driving motor and the gyroscope is minimized to negligible proportions since the rotor driving motor can be of small size and low power whereby the reaction forces are negligible. A more favorable angular momentum to weight ratio may be maintained as a result of a reduction in size of the gyroscope driving motor and the increase in speed given to the rotor. The reduction in weight and the very low aerodynamic drag greatly increase the bearing life of the gyrocsope rotor and therefore provide longer gyroscope efficiency.

As shown in Figs. 5, 6 and 7, the concept can be, and preferably is, applied to both ends of a gyroscopic device which provides a good practical means of operation and balances the forces applied to the gimbal bearings. The gyroscope is supported in a frame consisting primarily of a bottom or base 40, a top 41, and end plates 42 and 43, the end plates of which are of high magnetic permeable material. Shims may be used between the base and top and the end plates for reasons later to be made clear. In perpendicular alignment through the top and bottom frame members 40 and 41 are openings 44 and 45, respectively, for housing roller type bearings 46 and 47, respectively. These bearings rotatively support the trunnions 48 and 49, respectively, of the principal gimbal ring 50 of the gyroscope. A gyroscope rotor case 51 of magnet permeable material operates as the inner gimbal ring and is pivotally mounted inside the principal gimbal ring 50 by trunnions similar to 48 and 49 at 52 (see Fig. 5). The gyroscope rotor and its power motor means are housed within the case 51 on an axis perpendicular to the axis through the trunnions 52—52, and, as presently seen in Fig. 6, the rotor axis is perpendicular to the axis through the trunnions 48 and 49. The gyroscope rotor motor is electrically connected to a source of electrical energy through slip rings or preferably axial contacts (not shown) in the usual manner well understood in the art. The trunnion 49 is also adapted to be coupled to a telemetering system as a selsyn transmitter, or the like, as is well understood in the gyroscope art. The chamber into which the trunnion shaft 49 extends is closed by a cover 56 and the circuitry for the telemetering system is made through the connection block 53. In a similar manner a telemetering transmitter is adapted to be housed in the chamber 54 (see Figs. 5 and 6) having a cover 55 therefor.

On opposite ends of the gyroscope housing 51 are a pair of control coils 60, 61 and 62, 63, respectively. Each pair of control coils extend outwardly in V-formation from the end of the housing 51 at equal acute angles from the axis through the gyroscope rotor, the plane of the coils 60, 61 substantially passes through the axis of the trunnions 52—52 and the plane of the coils 62—63 substantially passes through the axis of the trunnions 48—49. In actual practice the planes through each set of coils 60, 61 and 62, 63 are in slight angular relation to their respective trunnion axes and the gyroscope is set in the carrying vehicle with the trunnion axis 52 slightly tilted with respect to the traverse axis of the vehicle. It has been found that by varying the angular relation slightly between the plane of the coils, the gyroscope axes, and the traverse axis of the carrying vehicle the distortions produced by the multiple control coils at each end of the gyroscope with the disks 68 can be minimized. The minimization of these distortions is further accomplished in the shim adjustment of the base 40, top 41, and end plates 42 and 43, as previously described, to control the air-gaps between the control coils and the disks. The control coils are electrically connected through slip rings or axial contacts (not shown) through the connector 53 as is well recognized in the art. Each pair have separate means for varying the current therein as will later be described. The control coils are supported on the housing 51 by base members 64.

The end plates 42 and 43 each have the inner surface spherically concave with the center of curvature at the intersection of the gyroscope gimbal axes. Each end plate also has a central opening housing a roller type bearing 66. Rotatably supported by each bearing 66 is a shaft 67 having a spherical disk 68 on the inner end thereof which disk is supported with the center of curvature at the intersection of the gyroscope gimbal axes. The disks 68 are each of a conductive material and are rotatable between the corresponding end plate and control coils in close air-spaced relation. Each shaft 67 has a rotor 69 of a hysteresis type motor thereon, the windings 70 thereof being supported in the motor case 71 attached to the end plates by screws 72. The end of each shaft 67 may likewise be bearing supported in the motor case by a roller type bearing 73. The windings 70 are coupled in parallel to a speed control circuit 74 to vary the speed of the motors and consequently the rotative speed of the disks 68 alike.

To produce a magnetic field across the disks 68 range coils 75 are positioned about the gyroscope between the end plates 42 and 43 with the polarity of all being in the same direction. The number and positions about the gyroscope is optional but is herein illustrated as three positioned in each of three corners of the end plates 42 and 43. A magnetic field can therefore be established from the range coils 75 through one end plate, for example 43, across the two air-spaces and the disk 68, through the control coils 62 and 63, through the base member 64 and the gyroscope case, and returned to the range coils 75 through the like elements 64, 60—61, 68, and 42. The current through the coils 75 is adjustable to vary the field as presently described.

As shown in Fig. 8 schematically, the current through the serially connected control coils 60—61 and 62—63 in inverse polarity relation may be separately controlled by the adjustable taps 76 and 77, respectively, of direct current voltage dividers. The current through the range coils 75, serially connected, is adjustable by a variable resistance 78, or the like. The direct current source for these elements, however, may be separate or rectified from a common alternating source as is most convenient and practical.

As shown in Fig. 9, the disks 68 can be rotated by a motor 80 through gear means 81 and 82, the gear 81 being a pinion on the motor shaft and the ring gear 82 being detachably fixed to the shaft 67.

The double ended eddy-current force system on the gyroscope provides means to make predetermined deflections of the gyroscope in the precession and computing operations and maintains the balance of the gyroscope about its gimbal axes without the necessity of adding weights as is necessary in the single ended device as shown by W in Fig. 1. The two pairs of control coils 60—61 and 62—63 are set in perpendicular planes to provide deflection control in both azimuth and elevation directions, the control coils 60—61 primarily controlling the azimuth deflections and the control coils 62—63 controlling the elevational deflections. The operation of the double ended eddy-current force system is theoretically the same as the single ended system although the double ended system provides a more practical modification and an improvement of precession accuracy and control in actual practice. The magnetic field passing through the control coils 62—63, for example, is cut by the disk 68 at a point between the control coil 62 and the end plate 43 and also between the control coil 63 and the end plate 43. Eddy-currents are created at both of these points in the disk 68 producing forces tending to oppose the rotation of the disk the reaction of which acts to force each control coil 62 and 63 toward the disk axis of spin where the rate of cutting the field is a minimum. The control coils 62—63 being fixed in position the reactive forces acting on them are neutralized at relative positions of each with respect to the eddy-current center or spin axis of the disk 68 in accordance with the control current pre-adjusted in them. That is, the control current in the coils 62—63 can be adjusted to cause a deviation of the gyroscope where one of the coil pole ends will settle nearer the eddy-current center or spin axis of the disk 68 than the other coil pole end. By this control current adjustment, shown by movable tap 77, Fig. 8, the gyroscope can be made to deviate a predetermined amount in elevation whereby elevational angles may be introduced into the gyroscope force system for certain gyroscope computed results. In like manner azimuthal deviations may be pre-set into the gyroscope by controlling the adjustable tap 76 to control the current through the control coils 60—61. The sensitivity of the gyroscope or the restoring force of the gyroscope can be varied by controlling the direct current through the range coils 75 or by varying the speed of the disk motors 71 although the latter is of less practical means. It is preferred that the rotative speed of the disk 68 be sufficiently high to produce adequate eddy-current forces yet not so high as to produce a secondary field of a strength to distort the primary field. A satisfactory rotative speed was found to be from 2000 to 4000 r.p.m.

The gyroscope of the type described herein may be used in a land, sea, or air vehicle in which the gyroscope frame would be attached to the vehicle frame and the telemetering system thereof coupled to an indicating or control system, or the like. Predetermined azimuthal and elevational deflective angles may be adjusted into the gyroscope whereby the desirable computed results of indication, vehicle or gun control, or the like, will be accomplished. The eddy-current force system of this invention provides a gyroscopic device of high efficiency with most of the disadvantages of the former known systems eliminated.

While many modifications and changes may be made in the constructional details and features to adapt the device to different uses without departing from the spirit and scope of this invention, we desire to be limited only by the scope of the appended claims.

We claim:

1. An eddy-current force applying system for precessing and controlling constrained gyroscopes comprising; an encased gyroscope gimbaled by gimbal axes on a gyroscope support frame for two degrees of freedom about its center of gravity with the gyroscope spin axis normal to one of the gimbal axes; two pairs of electromagnetic poles on the gyroscope case extending outwardly in two relatively normal planes on axes passing through said center of gravity symmetrical to the gyroscope spin axis, each pair being in acute angular relation; spherical disk means rotatably mounted on said gyroscope support frame with the center of curvature at the intersection of the gimbal axes and in close air-spaced relation with said electromagnetic poles; means to spin said spherical disk means; and means for controlling currents through said paired electromagnetic poles in each plane to establish magnetic control fields through said electromagnetic poles, across said air-space, and through said spherical disk means whereby reactive forces of eddy-currents created in said spherical disk means by cutting said magnetic control fields cause precession and positioning of said encased gyroscope in each plane in magnetic equilibrium with respect to the spin axis of said spherical disk means.

2. An eddy-current force applying system for precessing and controlling constrained gyroscopes comprising; an encased gyroscope gimbaled by gimbal axes on a gyroscope support frame for two degrees of freedom about its center of gravity with the gyroscope spin axis normal to one of the gimbal axes; two pairs of electromagnetic poles on the gyroscope case extending outwardly in two relatively normal planes on axes passing through said center of gravity symmetrical to the gyroscope spin axis, each pair being in acute angular relation; spherical disk means rotatably mounted on said gyroscope support frame with the center of curvature at the intersection of the gimbal axes and in close air-spaced relation with said electromagnetic poles; means to spin said spherical disk means; means for controlling currents in opposed relation through said paired electromagnetic poles in each plane to establish a magnetic control field in each plane through said electromagnetic poles, across said air-space, and through said spherical disk means; and means for establishing a primary magnetic field through electromagnetic poles, across said air-space, and through said spherical disk means whereby the reactive forces of eddy-currents created in said spherical disk means by cutting said magnetic control field in accordance with the opposed field strength will precess and position said encased gyroscope in magnetic equilibrium with respect to the frame and with a sensitivity in accordance with the primary magnetic field strength.

3. An eddy-current force apply system for precessing and controlling constrained gyroscopes comprising; an encased gyroscope gimbaled by gimbal axes on a gyroscope support frame for two degrees of freedom about its center of gravity with the gyroscope spin axis normal to one of the gimbal axes; electromagnetic pole means on the gyroscope case symmetrical to the gyroscope spin axis establishing two relatively normal planes of magnetic force; spherical disk means rotatably mounted on said gyroscope support frame about its own axis with the center of curvature thereof at the intersection of the gimbal axes and in close air-space relation with said electromagnetic pole means; means to spin said spherical disk means; means for controlling currents through said electromagnetic pole means to establish a magnetic control field separately in each said plane through said electromagnetic pole means, across said air-space, and through said spherical disk means for establishing eddy-currents in said spherical disk means to cause reactive forces on said electromagnetic pole means whereby it precesses to a point of magnetic equilibrium in each said plane with respect to the spherical disk means spin axis; and means for establishing a primary magnetic field through said electromagnetic pole means, across said air-space, through said spherical disk, and through the case of said encased gyroscope for supplementing each said magnetic control field thereby increasing the sensitivity of gyroscope precession.

4. An eddy-current force applying system as set forth in claim 3 wherein said means for establishing a primary magnetic field includes means for varying the magnetic field strength thereby providing variable control of the gyroscope precessing sensitivity.

5. An eddy-current force applying system for precessing and controlling constrained gyroscopes comprising; an encased gyroscope gimbaled by gimbal axes on a frame for two degrees of freedom about its center of gravity with the gyroscope spin axis perpendicular to one of the gimbal axes; a spherical disk rotatively mounted to spin about its own axis on said frame at opposite positions of said encased gyroscope on an aligned axis passing through the intersection of the gimbal axes, each spherical disk having its center of curvature at the intersection of the gimbal axes, and each being rotatively spun by motive power means; paired magnetic poles on each end of said encased gyroscope symmetrical to the gyroscope spin axis and extending outwardly on lines radiating from the intersection of said gimbal axes, said paired magnetic poles each being in close air-spaced relation with the respective spherical disk and establishing a magnetic control field across the respective spherical disk; and means establishing a primary magnetic field through said paired magnetic poles, through the gyroscope case, across said air-spaces, and through the spherical disks supplementing said magnetic control field whereby the gyroscope is precessed and positioned in accordance with said magnetic control fields with the sensitivity in accordance with the primary magnetic field by eddy-currents created in each spherical disk from the primary and control magnetic fields causing reactive forces on said paired magnetic poles until magnetic equilibrium is reached.

6. An eddy-current force applying system as set forth in claim 5 wherein said paired magnetic poles on each end of said encased gyroscope are arranged in two separate planes, at one end the plane being vertical and at the other end being horizontal to establish elevational and azimuthal control, respectively.

7. An eddy-current force applying system as set forth in claim 6 wherein each pair of magnetic poles in a plane are variable in field strength in inverse polarity relation supplemental to the primary field whereby angular deviations may be introduced in said gyroscope in said vertical and horizontal planes.

8. An eddy-current force applying system as set forth in claim 7 wherein said frame is fabricated from assembled parts and said air-spaces are preadjusted in assembly by shims, and said planes of precession of said pairs of magnetic poles are positioned in slight angular relation with respect to said gimbal axes for minimizing distortional errors.

9. An eddy-current force applying system for precessing and controlling angular deviations of constrained gyroscopes comprising: an encased gyroscope gimbaled by gimbaled axes on a frame for two degrees of freedom about its center of gravity with a gyroscope spin axis normal to one of the gimbal axes, said frame having opposite end plates with the inner surfaces spherical about a common point lying on the intersection of the gimbal axes; paired magnet pole means on each end of said encased gyroscope symmetrical to the gyroscope spin axis and sweepable over the respective end plate spherical surface for establishing a magnetic control field; a spherical disk rotatively journaled centrally of each end plate between said respective end plate and paired magnet pole means with small air-space therebetween; a means for establishing a primary magnetic field through said end plates, through said paired magnet pole means and the case of the gyroscope, and across said disks and air-spaces; and motive means for spinning said disks on their respective rotatable journals whereby the reactive forces of eddy-currents created in said disks by cutting said primary and control fields forces said encased gyroscope to a predetermined position with the sensitivity of the primary field strength in which the reactive forces on said paired magnet pole means are in equilibrium.

10. An eddy-current force applying system as set forth in claim 9 wherein said paired magnet pole means on each end of said encased gyroscope radiate outwardly from said common point at an acute angle, one such pair lying with its magnetic field in an azimuthal plane through said common point and another of such pair lying with its magnetic field in a vertical plane through said common point.

11. An eddy-current force applying system as set forth in claim 10 wherein each pair of magnetic poles on opposite ends of said encased gyroscope is variable in field intensity in opposed polarity relation across its plane to individually control angular deviations of said gyroscope in said azimuthal and vertical planes.

12. An eddy-current force applying system for precessing and controlling constrained gyroscopes comprising: an encased gyroscope gimbaled by gimbal axes on a frame for two degrees of freedom about its center of gravity with a gyroscope spin axis normal to one of said gimbal axes; a pair of electromagnetic poles on each end of said encased gyroscope symmetrical to a longitudinal axis passing through the intersection of the gimbal axes and to said gyroscope spin axis, said pair of electromagnetic poles of each end providing a field lying in a plane, the plane of one being perpendicular to the plane of the other and the paired pole planes being angularly disposed in a predetermined manner with respect to the gimbal axes; means for controlling the current independently through each pair of electromagnetic poles of each end; a spherical eddy-current disk rotatively mounted on said frame on each end of said encased gyroscope on an aligned axis passing through the intersection of the gimbal axes and in close air-spaced relation with the respective paired electromagnetic poles, and each disk being prepositioned with respect to each other along said aligned axis; means for rotating said eddy-current disks at variable selective rotative speeds; electromagnetic means for establishing a primary magnetic field through the case of the gyroscope, across said eddy-current disks, and across said air-spaces; and means for varying the current through said electromagnetic means establishing said primary magnetic circuit whereby the rates of cutting the primary field is controllable by the rotative speed of the eddy-current disk and the primary magnetic field, and angular deviations of the gyroscope is controllable by the current through said paired electromagnetic poles.

13. An eddy-current force applying system as set forth in claim 12 wherein said paired electromagnetic poles on each end of said encased gyroscope forming perpendicular planes has the pair on one end lying in the azimuthal plane and the pair on the other end lying in an elevational plane.

14. An eddy-current force applying system as set forth in claim 13 wherein said means for controlling the current independently through the paired electromagnetic poles of each end controls the current in the paired poles on the opposite sides of said longitudinal axis in inverse relation whereby the paired poles precesses said gyroscope in the plane of the poles to a position of equilibrium in that plane.

References Cited in the file of this patent
UNITED STATES PATENTS

| | | |
|---|---|---|
| 2,247,142 | Anscott et al. | June 24, 1941 |
| 2,513,329 | Johnson | July 4, 1950 |
| 2,600,476 | Bursack | June 17, 1952 |

FOREIGN PATENTS

| | | |
|---|---|---|
| 492,670 | Great Britain | Sept. 23, 1938 |
| 554,620 | Great Britain | July 13, 1943 |